Jan. 20, 1970 J. E. KRYNSKI ET AL 3,490,595
KEYHOLE LOCK FILTER LEAF GUIDE
Filed Dec. 21, 1967 2 Sheets-Sheet 1
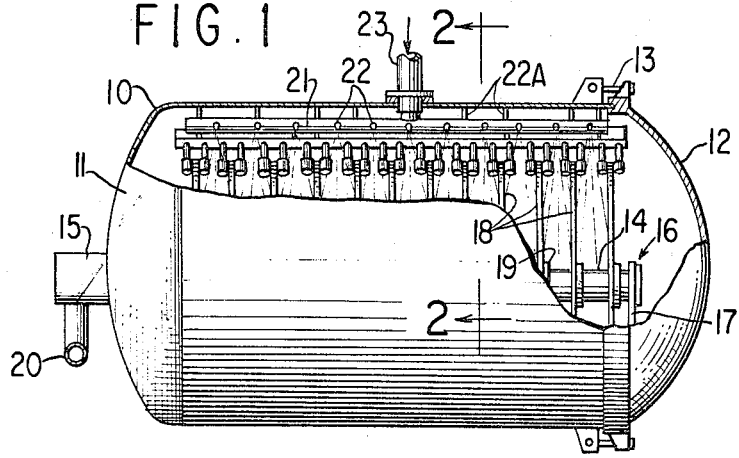
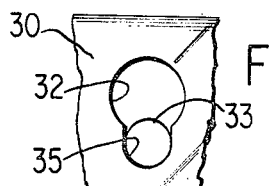
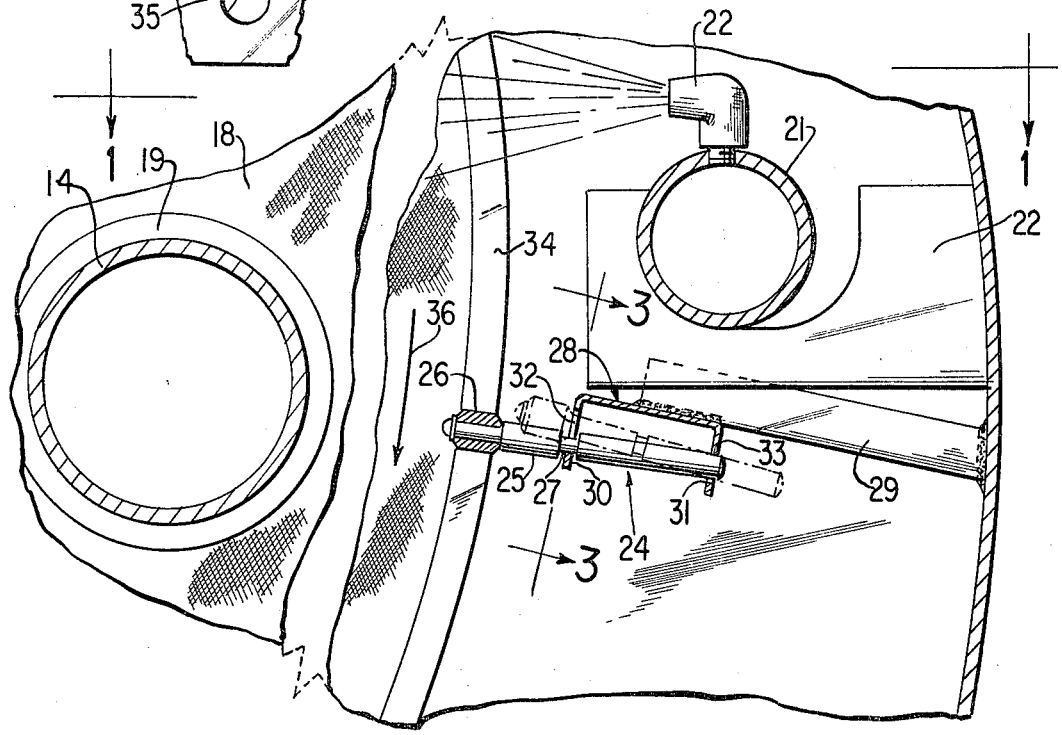
INVENTORS
John E. Krynski
Ernie G Seggebruch
BY
Smythe & Moore
ATTORNEYS INVENTORS
John E. Krynski
Ernie G Seggebruch
BY
ATTORNEYS 3,490,595
KEYHOLE LOCK FILTER LEAF GUIDE
John E. Krynski and Ernie G. Seggebruch, East Moline, Ill., assignors to Ametek, Inc., New York, N.Y., a corporation of Delaware
Filed Dec. 21, 1967, Ser. No. 692,519
Int. Cl. B01d 29/04
U.S. Cl. 210—238
10 Claims

ABSTRACT OF THE DISCLOSURE

A rotary leaf filter having a pair of rollers engaging opposing surfaces of each filter leaf adjacent its periphery to maintain the leaf in alignment and retractable to a disengaged position. Each roller is mounted on the end of a shaft which is movably supported for radial movement toward and away from the filter leaves.

---

The present invention relates to a filter apparatus having a plurality of filter leaves mounted on a shaft rotatably journaled within a tank, more particularly, to an arrangement for the mounting of rollers means within the tank to maintain the filter leaves in alignment and the movement of the rollers toward or away from the filter leaves.

The filter leaves are generally covered on both sides thereof with filter leaf screens. To initiate the filtering operation the filter leaves are generally precoated with a filtering media. The filtering media may be introduced into the tank in suspension in a liquid medium which enters the screens and then is discharged through the tubular shaft supporting the filter leaves. The filter leaf screens prevent the filter media particles from entering the filter leaves so that the filtering media becomes deposited on the screens and thus augments the filtering capacity of the filter screens. Upon completion of a filtering operation, the screens must be cleaned and the filtering media deposit must be removed from the screen. This is generally accomplished by spraying the filter leaves from jets while the leaves are being rotated.

One difficulty encountered with such filter leaf devices is that the filter leaves are formed of relatively fine mesh screen carried by a relatively light framework and tend to become warped and deformed in operation. The screens thus are not in the proper position to receive the full effect of the cleansing spray jets. Various forms of alignment devices for the filter leaves have been proposed but such devices are generally unsatisfactory in that they are either too complicated in construction or unreliable in operation over extended periods of time.

It is an object of the present invention to provide a novel and improved alignment arrangement for the filter leaves for a rotary filter leaf apparatus.

It is another object of the present invention to provide a roller alignment structure for rotatable filter leaves wherein individual roller structures may be selectively disengaged from the filter leaves.

It is an additional object of the present invention to provide a roller alignment structure for rotatable filter leaves wherein the rollers may be disengaged or engaged with the filter leaves by actuation of structure exterior of the filter tank.

It is a further object of the present invention to provide in a rotary leaf filter a leaf spacer assembly and a spray system for washing the filter leaves.

In one aspect of the present invention a rotary filter leaf apparatus may be provided with a substantially cylindrical tank having a shaft rotatably mounted therein longitudinally of the tank. A plurality of filter leaves are spaced longitudinally on the shaft and extend radially therefrom. Within the tank there are provided spray means positioned outwardly of the peripheries of the filter leaves and so positioned to spray a cleaning fluid against the filter surfaces of the leaves. Also mounted within the tank are roller means which normally contact the filter leaves adjacent their peripheries to maintain the filter leaves in alignment. Two roller means contact the opposing surfaces of a filter leaf and the roller means are individually or collectively retractable to a disengaged position.

Other objects and advantages of the present invention will be apparent from the accompanying description and the following drawings, which are exemplary, wherein;

FIG. 1 is a side elevational view partly in longitudinal section showing a rotary filter leaf apparatus incorporating the present invention;

FIG. 2 is a sectional view in enlarged scale taken along the line 2—2 of FIG. 1 and showing construction details of the roller spacer assembly;

FIG. 3 is a view taken along the line 3—3 of FIG. 2 and showing the bracket openings for receiving the roller spacer means;

Proceeding next to the drawings wherein like reference symbols indicate the same parts throughout the various views a specific embodiment of the present invention will be described in detail.

Figure 4:
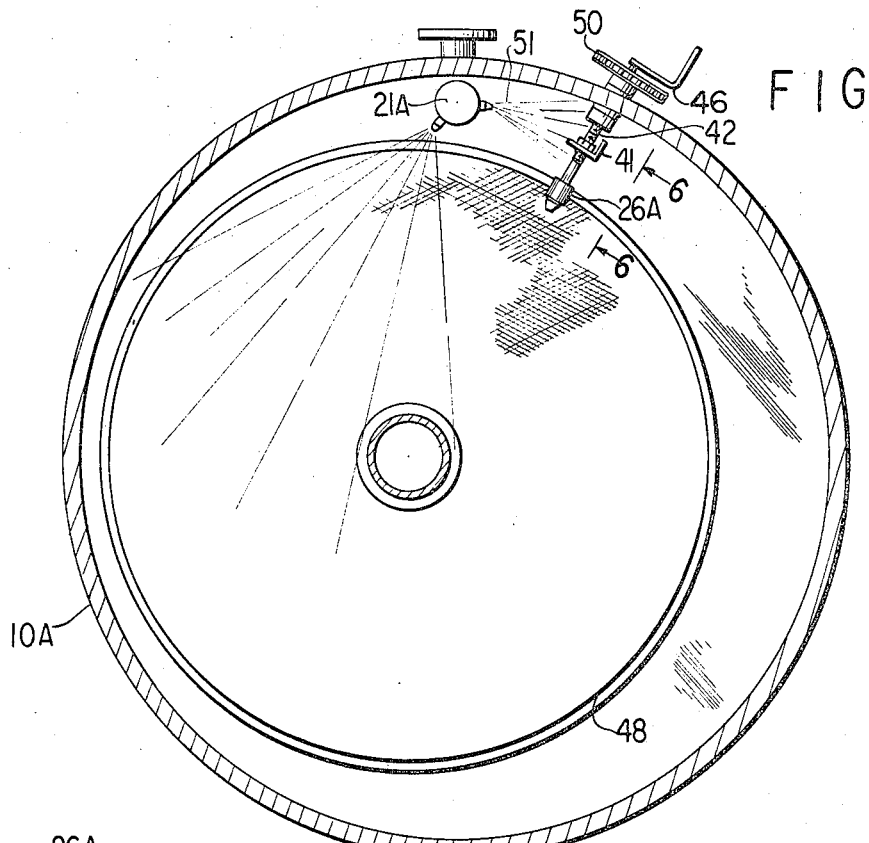
FIG. 4 is a sectional view similar to that of FIG. 2 but showing a modification of the roller spacer assembly where the entire assembly of rollers is retractable.

As may be seen in FIG. 1 the present invention is incorporated in a rotary filter apparatus comprising a horizontal and substantially cylindrical tank 10 having an integral end wall 11 and a removable outer end wall 12 which is secured to the open end of the tank in a conventional manner such as by bolts 13.

A tubular shaft 14 is rotatably mounted longitudinally within the tank and is journaled at the inner end of the tank in a bearing 15 and journaled at its outer end in a hanger assembly 16 which provides a bearing for the shaft. The hanger assembly comprises a strap 17 which may be secured to the top of tubular shaft 14.

A plurality of filter leaves 18 are spaced longitudinally on the shaft 14 with each filter leaf having a hub 19 which is keyed or otherwise secured to the shaft. The filter leaves are of a conventional construction and essentially comprise a frame carrying on each side screens with a filter being secured between the screens. The filter leaves are so constructed that the screens are spaced apart whereby fluid entering through the screens passes between the screens and into the hollow shaft through openings (not shown) in the shaft and then discharged through the pipe 20.

The shaft 14 is rotated by a suitable drive mechanism (not shown) which may be mounted exteriorly of the tank. The tank may also be provided with an inlet opening through which the liquid to be filtered may be introduced.

In order to clean the screens of the filter leaves, a sluice pipe 21 is mounted within the tank on brackets 22A and extends longitudinally of the tank coextensively with the filter leaves. The sluice pipe has a plurality of individual spray jets 22 which are positioned as shown in FIG. 1 so as to spray the cleaning fluid between adjacent filter leaves. The sluice pipe 21 is connected to a suitable source of cleaning fluid through inlet pipe 23 which may be seen in FIG. 1.

In order to maintain the proper spacing and alignment of the rotary filter leaves a roller assembly indicated generally at 24 in FIG. 2 is provided with two of such assemblies being used for each filter leaf. Each roller assembly comprises a shaft 25 having a roller 26 on the end thereof with the shaft being provided with an annular groove 27. The shaft is mounted in a U-shaped bracket 28 secured to a support bar 29 which may be welded to the tank shell.

The U-shaped bracket has legs 30 and 31 with leg 30 having a keyhole shaped opening 32 therein as shown in FIG. 3 and leg 31 having a circular opening 33 as also shown in FIG. 3. The circular opening 33 and the circular portion of keyhole opening 32 conform to the circumference of roller shaft 25.

When the spacer rollers are in their normal engaged positions it may be seen that the rollers 26 engage the opposing surfaces of a filter leaf adjacent the periphery thereof on the angular area indicated at 34. The relationship of each pair of rollers to a filter leaf may be seen in FIG. 1. The shaft groove 27 is locked in the narrow portion 35 of keyhole 32 and the shaft is thus prevented against any axial movement. Since the filter leaves rotate in the direction indicated by the arrow 36 in FIG. 2 or downwardly, the rotating filter leaves will urge the rollers downwardly and hence keep the shaft locked in the keyhole opening of the bracket.

When it is desired to clean the filter leaves, the shaft 14 and the filter leaves are rotated while the desired cleaning fluid is introduced into sluice pipe 21 through the supply pipe 23 and sprayed onto both sides of the filter leaves through spray jets 22. Should the filter leaves become warped or deformed in operation, the limit to which they can rotate out of their normal plane is determined by the alignment rollers 26. When individual filter leaves are removed from the drum for overhaul or replacement, the respective alignment rollers may be retracted into the position as shown in dash lines in FIG. 2 out of the path of axial movement of the filter leaves. The particular filter leaves can then be withdrawn axially from the shaft 14.

Figure 6:
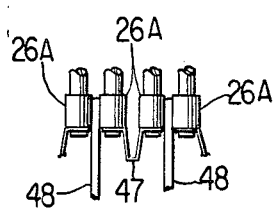
FIG. 6 is a fragmentary view looking in the direction 6—6 of FIG. 4.
Figure 5:
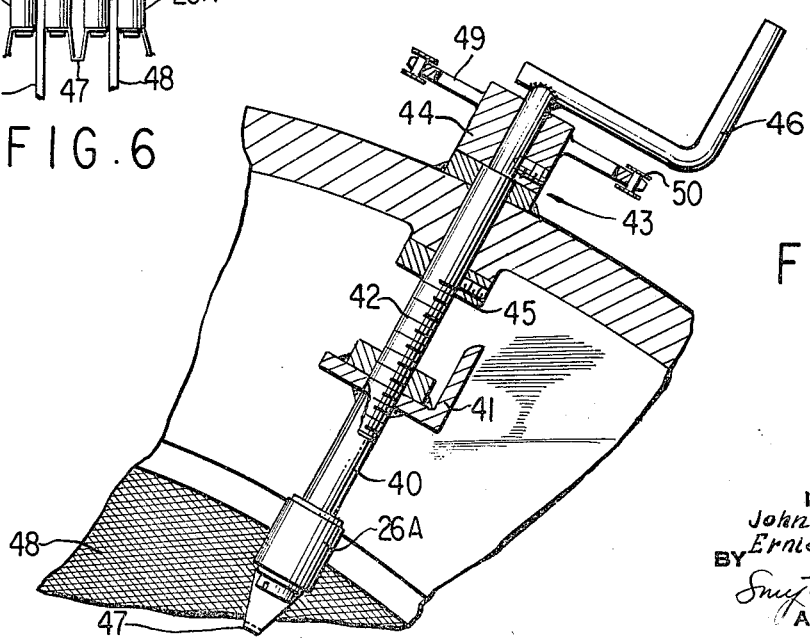
FIG. 5 is an enlarged fragmentary view of FIG. 4.

In FIGS. 4 and 5 there is illustrated a modification of the present invention wherein the rollers 26A may be disengaged from the peripheries of their respective filter leaves by manipulation exteriorly of the tank. The rollers 26A are mounted on respective rods or shafts 40 which are each threaded through angle member 41 which extends longitudinally throughout the length of the tank. The angle member 41 is supported on threaded rods 42 rotatably mounted at 43 in the wall of the tank 10A. One threaded rod may be adjacent the front of the tank wall 10A and one adjacent the rear thereof. Thrust collars 44, 45 are mounted on shaft 42. Shafts 42 may be turned by crank 46 to move the angle 41 with rollers 26A toward and away from the leaves of the filter. Adjacent rollers 26A may have guide means 47 (FIG. 6) therebetween for guiding movement thereof between leaves 48. Preferably sprockets 49 connected by chain 50 connect the front and rear threaded shafts 42 so that when one is rotated the other turns therewith so that angle 41 and the rollers are moved in and out together.

Sluice pipe 21A may be provided with an additional spray jet 51 which is directed upon the rollers when they are in the retracted position.

Thus it can be seen that the present invention provides a simple but effective roller alignment structure for maintaining rotary filter leaves in proper alignment. The aligning mechanism may be readily retracted to a disengaged position to permit removal of particular filter leaves. In addition, the roller structure may be mounted within the filter tank in such a manner that the rollers may be individually disengaged from the filter leaves or the entire roller assembly may be retracted from the filter leaves in unison. The contact between the aligning structure and the filter leaves is through a roller which engages the surface of a filter leaf adjacent its periphery. This rolling contact presents a minimum of friction but since the rollers are continually in contact with the filter leaves, the leaves are at all times maintained in proper spacing and alignment.

What is claimed is:

1. In a rotary leaf filter apparatus, a substantially cylindrical tank, a shaft rotatably mounted within said tank longitudinally thereof, a plurality of filter leaves spaced longitudinally on said shaft and extending radially therefrom, spray means within said tank outwardly of the peripheries of said filter leaves for spraying a cleaning fluid against the filter surfaces of said leaves, and roller means mounted within said tank normally engaging both sides of said filter leaves adjacent their peripheries to maintain said filter leaves in alignment and being selectively disengageable therefrom and to a position away from said leaves.

2. In a rotary leaf filter apparatus as claimed in claim 1 and further comprising means for retaining said roller means in disengageable relationship.

3. In a rotary leaf filter apparatus as claimed in claim 1 with said spray means comprising a sluice pipe longitudinally of said tank and having a plurality of spray nozzles thereon.

4. In a rotary leaf filter apparatus as claimed in claim 1 with there being a pair of roller means engaging the opposing surfaces of each filter leaf.

5. In a rotary leaf filter apparatus as claimed in claim 4 and further comprising an elongated member positioned radially outwardly of said filter leaves and extending longitudinally of said tank with said roller means being mounted on said member, and means for moving said member and the roller means attached thereto away from and toward said filter leaves.

6. In a rotary leaf filter apparatus as claimed in claim 1 with each of said roller means comprising a U-shaped bracket mounted on an inner surface of said tank, there being aligned openings in the legs of said bracket, and a shaft having a roller on one end thereof supported in said bracket openings.

7. In a rotary leaf filter apparatus as claimed in claim 6 with said bracket first leg being away from said filter leaves and the opening therein have a circular shape, said other opening having a keyhole shape, said shaft having an angular groove therein receivable in the narrow portion of said keyhole opening when said roller is engaging the filter leaf.

8. In a rotary leaf filter apparatus as claimed in claim 7 with said roller being movable to its disengaged position when the shaft groove is raised from said keyhole narrow portion and the shaft and roller retracted away from the filter leaf.

9. In a rotary leaf filter apparatus as claimed in claim 1 and further comprising means for disengaging collectively said roller means from said filter leaves.

10. In a rotary leaf filter apparatus as claimed in claim 9 and further comprising means on the exterior of said tank for actuating said collective disengaging means for said rollers.

References Cited

UNITED STATES PATENTS

| 1,649,581 | 11/1927 | Genter et al. | 210—331 X |
| 2,434,807 | 1/1948 | Little | 210—331 |
| 3,322,277 | 5/1967 | Pearson et al. | 210—327 X |
| 3,329,274 | 7/1967 | Landon | 210—334 |

REUBEN FRIEDMAN, Primary Examiner

F. A. SPEAR, Jr., Assistant Examiner

U.S. Cl. X.R.

210—327, 331, 334